United States Patent [19]

Hane et al.

[11] 4,208,576
[45] Jun. 17, 1980

[54] AUTOMATIC READER OF PROCESSING CONDITION DATA FOR ARTICLES TO BE PROCESSED IN AN AUTOMATIC PROCESSING SYSTEM

[75] Inventors: Yoshio Hane, Kawasaki; Nobuo Chino, Komae, both of Japan

[73] Assignee: Taisei Kensetsu Kabushiki Kaisha, Tokyo, Japan

[21] Appl. No.: 954,167

[22] Filed: Oct. 24, 1978

[30] Foreign Application Priority Data

Jun. 26, 1978 [JP] Japan .................................. 53-77197

[51] Int. Cl.² ........................ G06K 7/02; G06F 15/46; G06M 1/12
[52] U.S. Cl. .................................. 235/452; 235/376; 235/201 R
[58] Field of Search .............. 235/452, 200, 201, 376; 137/81, 557; 73/37

[56] References Cited

U.S. PATENT DOCUMENTS

| 3,743,817 | 7/1973 | Kuehnle | 235/452 |
| 3,746,841 | 7/1973 | Fenske | 235/452 |

Primary Examiner—Daryl W. Cook
Attorney, Agent, or Firm—Wenderoth, Lind & Ponack

[57] ABSTRACT

A pneumatic apparatus used for reading punch cards containing processing condition data for articles being processed in an automatic system. The apparatus has a pneumatic reading head for reading the punch cards, and the head has a plurality of air conduits therein. Each conduit has an inlet and an outlet. An air supply is connected to the air conduits for supplying air thereto, and a back pressure detector is provided in each conduit for detecting back pressure therein. The apparatus also includes a movable carrier jig for holding and carrying the article being processed in said system and the jig has a card fitting portion thereon for holding the punch card. The carrier jig is movable toward and away from the conduits so that the card on the card fitting portion can be positioned adjacent the outlets of the conduits. Air passing through the conduits creates a back pressure in the conduits corresponding to those portions of the punch cards which are solid when the punch card on the carrier jig is positioned adjacent the conduit outlets, and the back pressure is detectable by the back pressure detecting means, thus permitting the solid and punched portions of the punch card to be determined.

2 Claims, 3 Drawing Figures

AUTOMATIC READER OF PROCESSING CONDITION DATA FOR ARTICLES TO BE PROCESSED IN AN AUTOMATIC PROCESSING SYSTEM

The present invention relates to an automatic reader for reading processing condition data from a card for processing articles in an atuomatic processing system.

In a plating system for example, if various kinds of unprocessed articles are present which require different individual processing conditions, such as different pretreatments, or different plating currents and plating times, or if they must be subjected to plating at random in one unit of a plating apparatus, each unprocessed article must be identified so that the processing conditions for the plating equipment for that specific article can be set prior to the start of the plating process. For presenting the various kinds of processing condition data, conventionally, a punched card containing the processing condition data is prepared by selectively punching the card according to a certain predetermined order. The card is inserted into a reader, separately from the unprocessed article concerned, where the existence of the punched holes is detected electrically or optically, and the processing condition data is determined. However, since the corresponding unprocessed article and its punched card are separated in this way, the various unprocessed articles must be related to their punched cards containing their processing condition information by card operators, and when this step is required, true automation cannot be attained. An operator must view each unprocessed article directly, identify it, and then insert the condition setting card corresponding to that article into the card reader, or he must enter a code number corresponding to the processing conditions by a typewriter or other means to set the processing conditions by a digital controller. These conventional methods are susceptible not only to human errors, like erroneous identification of the articles and double setting of or failure to set the processing conditions, but are also not very efficient and place a heavy burden of responsibility on the operator.

To identify the various kinds of unprocessed articles, methods such as color identification and limit switch operation are used, but these methods permit the identification of only several different kinds of articles and cannot be applied to the identification of hundreds or thousands of kinds of articles.

There is another disadvantage to these methods as well; they cannot be utilized stably in an atomsphere which will cause staining due to dust, oil, etc., or in a corrosive atmosphere. Furthermore, any method which requires electrical contacts creates a problem when trying to provide an explosion-proof structure for use in an explosive atmosphere.

SUMMARY OF THE INVENTION

The present invention has resolved these conventional disadvantages completely. This invention provides an automatic reader which allows unprocessed articles of many various kinds to be easily identified. The invention automatically and simply reads the processing condition data for the respective unprocessed articles, and performs this reading very stably and with a high degree of reliably, even in an atmosphere where staining is caused by dust, and oil, etc., or in a corrosive atmosphere. Furthermore the present invention can even be utilized in an explosive atmosphere, since it is substantially an explosion-proof structure.

BRIEF DESCRIPTION OF THE DRAWINGS

Further objects and advantages of the invention will be apparent from the following description taken with the drawing therein.

DETAILED DESCRIPTION OF THE INVENTION

Figure 1:
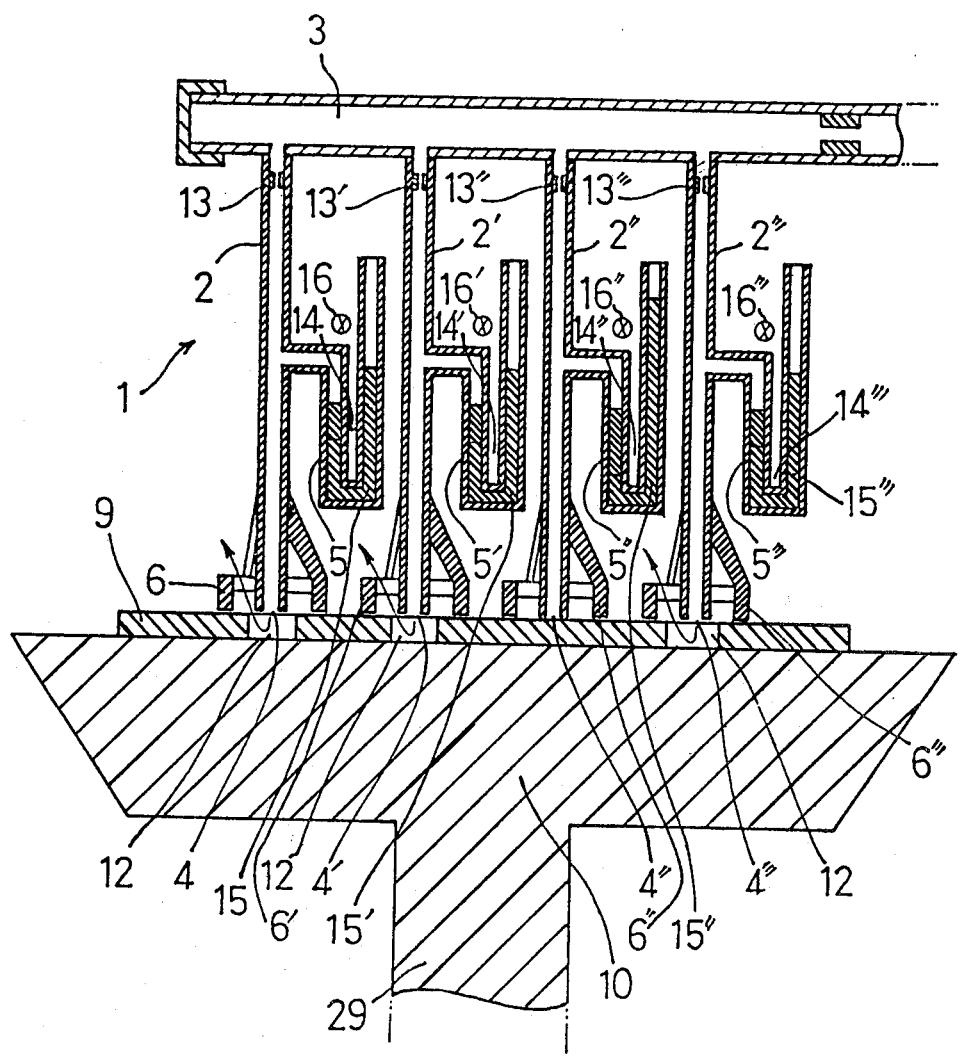
FIG. 1 is cutaway of a reader of this invention.
Figure 2:
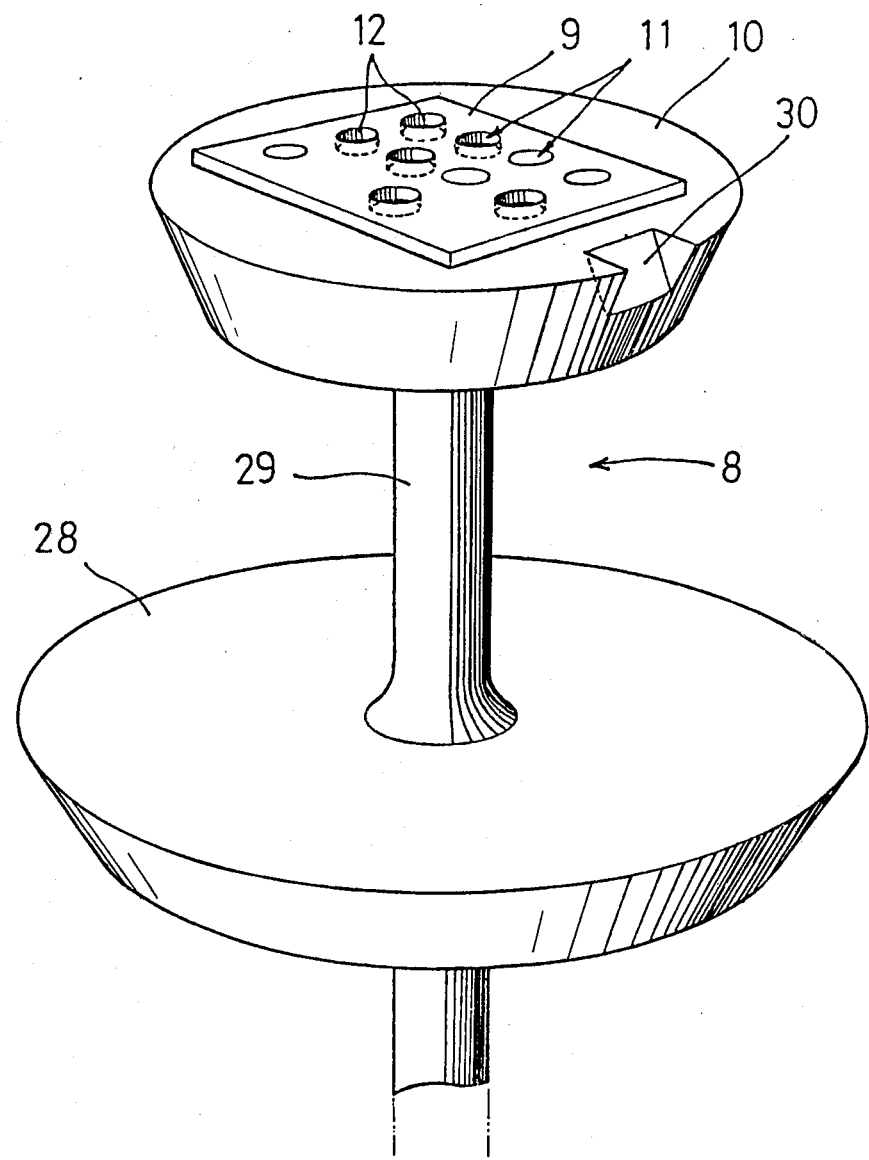
FIG. 2 shows a data card in position on a carrying surface.

Below is described the present invention in detail in reference to one embodiment.

A reading head 1 is provided with a plurality of air conduits 2, 2', 2'', 2''' which are connected to an air supply pipe 3. The conduits have air outlets 4, 4', 4'', and 4''' arranged on a plane in a predetermined arrangement, and output pipes 5, 5', 5'' and 5''', which detect back pressures, are connected to the respective air conduits 2, 2', 2'' and 2'''. Punched card stoppers 6, 6', 6'' and 6''' are provided around the air outlets 4, 4', 4'' and 4'''. In the drawing, there are only four air conduits 2, 2', 2'' and 2''', but this number is shown simply for convenience of description, and any number of these air conduits can of course be arranged lengthwise and crosswise according to the number of kinds of unprocessed articles 7 and the variety of processing condition data. An unprocessed article carrier jig 8 has attached thereto an unprocessed article 7 which will be processed in the processing system. The carrier jig 8 is designed to be fed through the processing system with the article attached thereto. The unprocessed article carrier jig 8 is also provided with a fitting portion 10 for a punched card 9.

The punched care 9 is selectively punched in punching positions 11 in correspondence to the pre-arranged air outlets 4, 4', 4'' and 4''' of the reading head 1. The punched positions 11 express the processing condition data by a combination of holes 12. The punched card 9 is positioned on the surface of the fitting portion 10 of the unprocessed article carrier jig 8. For positioning the punched card 9, a fitting groove may be formed on the surface of the fitting portion 10 so that the punched care 9 may be simply slided into the fitting groove, or the card be fitted onto the fitting portion by screws, adhesive tapes and the like. Any other fitting methods may also be applied.

In this arrangement, prior to the processing of the unprocessed article 7 in the processing system, the unprocessed article 7 is fed to a predetermined reading position while it is mounted on the unprocessed article carrier jig 8. Then, the arranged punching positions 11 on the card 9 are made to coincide with the arranged air outlets 4, 4', 4'' and 4''' of the reading head 1, thereby bringing the air outlets 4, 4', 4'' and 4''' into contact with or near the punched card 9. Next, air with a predetermined pressure is supplied to the respective air conduits 2, 2', 2'' and 2''' from the air pressure supply pipe 3 and flows out of the air outlets 4, 4', 4'' and 4'''. The back pressures at the air outlets 4, 4', 4'' and 4''' corresponding to the holes 12 rises a little in comparison to the pressure before the holes are brought into contact with or are near the punched card. The back pressure of the air outlet 4'' corresponding to the portion with no hole 12 rises greatly. Therefore, by detecting the difference in back pressures in the output pipes 5, 5', 5" and 5''' corresponding to the respective air outlets 4, 4', 4" and 4''', the existence of holes 12 in the respective punching positions 11 of punched card 9 is detected. When the air outlets 4, 4', 4" and 4''' are brought near the punched card 9, without being brought into contact therewith, the distance between the air outlets 4, 4', 4" and 4''' and the punched card 9 can be determined to allow the detection of the difference of back pressures due to the existence of holes 12. The air to the air conduits 2, 2', 2" and 2''' can be supplied continuously or only at the time of measurement at constant pressure.

In FIG. 1, to illustrate a method of detecting the difference of back pressures, U-shaped pipes 14, 14', 14" and 14''' and their respective output pipes 5, 5', 5" and 5''' and are provided between the air outlets 4, 4', 4" and 4''' and the orifices 13, 13', 13" and 13'''. The U-shaped pipes are filled with mercury 15, 15', 15" and 15''', and on the downstream sides of the U-shaped pipes 14, 14', 14" and 14''', proximity switches 16, 16', 16" and 16''' are set at the positions where the mercury 15, 15', 15" and 15''' ultimately raises due to the great rise in back pressure. In this embodiment, mercury 15, 15' and 15''' does not reach the proximity switches 16, 16' and 16''' since there is only a slight rise in back pressure at the air outlets 4, 4" and 4''' corresponding to the holes 12, and therefore, the proximity switches 16, 16' and 16''' do not operate. But, the great rise in the back pressure at the air outlet 4" corresponding to the portion with no hole 12 causes the mercury 15" to reach the position of the proximity switch 16" and thus activate the proximity switch 16". This method of detecting the difference in back pressure is simply one embodiment, and it is naturally to be understood that any method which allows the detection of differences in back pressures can be used.

As mentioned, the present invention permits the detection of the existence of holes 12 in the respective punching positions 11 of a punched card 9 by recognizing the difference in back pressures at the air outlets 4, 4', 4" and 4''' arranged corresponding to the punching positions 11, and therefore reads processing condition data expressed as a combination of these holes 12. The advantages of the reader of the present invention for detecting the existence of the holes 12 of punched card 9 are as follows. First, the reader has no electric contacts opened to the atmosphere at all; it is entirely pneumatically operated. Therefore, the reader provides a substantially explosion-proof structure which is very safe even in an explosive atmosphere. Secondly, the reader of the present invention is not affected by staining or corrosion, thereby allowing stable and highly reliable reading for a long period of time even in an atmosphere which usually creates much staining due to dust, oil, etc., or in a corrosive atmosphere where optical or electric reading is liable to be inaccurate due to contact failure or staining, caused by the atmosphere.

A further feature of the present invention lies in the fact that the unprocessed article carrier jig 8 actually carries each article 7 to be processed in the processing system and is designed to proceed through the processing system while holding the article 7. The unprocessed article carrier jig 8 is provided with the punched card fitting portion 10 for the punched card 9, and the punched card 9 is fitted onto the surface of the fitting portion 10. As a result, of so mounting the card corresponding to each article, the present invention permits identification of different kinds of unprocessed articles 7 by reading the processing condition data on the cards, corresponding to the respective unprocessed articles 7 mounted on the unprocessed article carrier jigs 8. Special operators are not required to identify the kinds of articles, thus contributing toward automation of the process and helping to eliminate human errors. Together with the benefits of the pneumatic system, this card reading system provides very simple, stable and highly reliable identification of the various kinds of articles.

Figure 3:
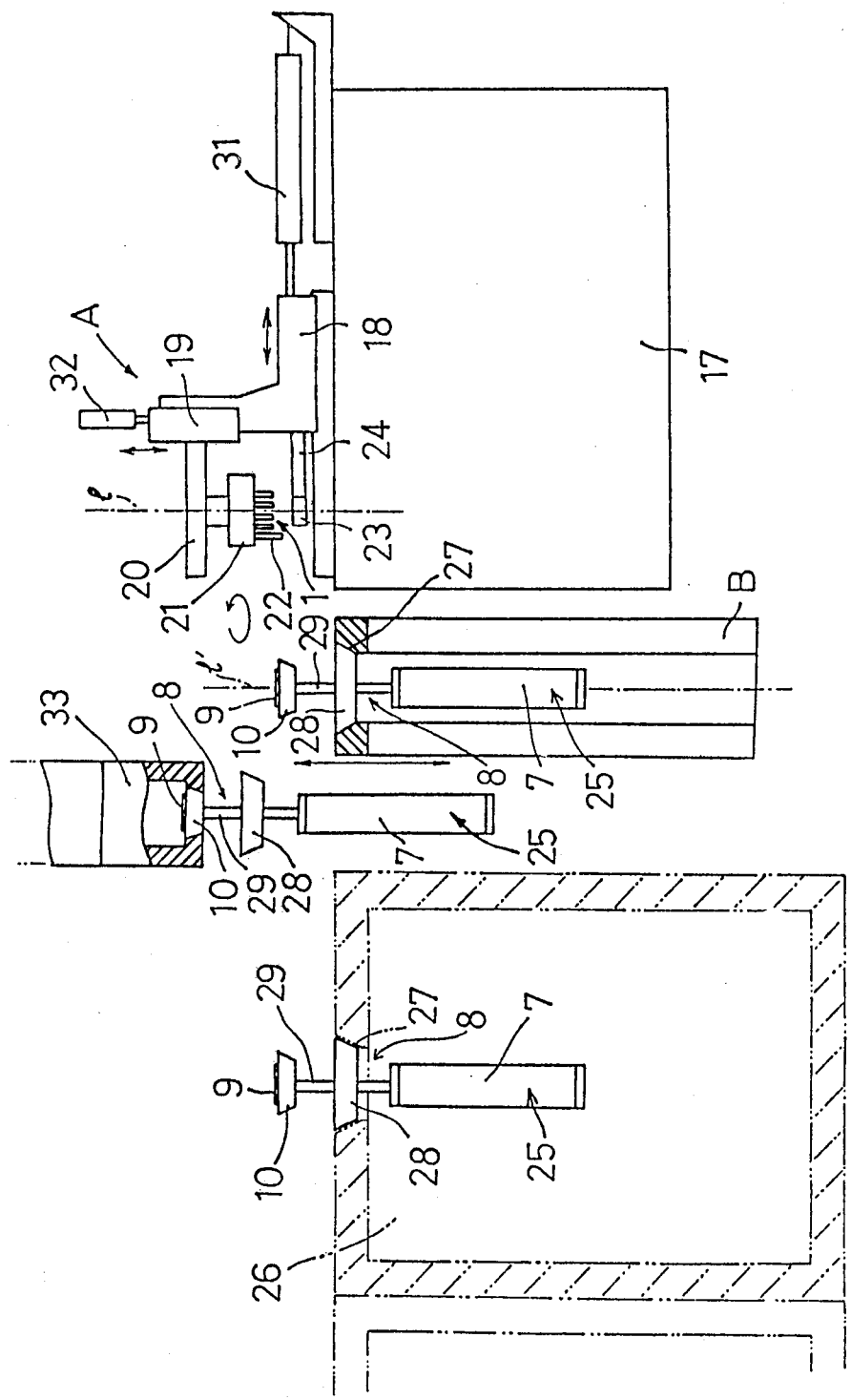
FIG. 3 is an embodiment of the card reader in a plating process.

FIG. 3 shows the incorporation of the reading system of the present invention into a plating system. Symbol A indicates a reader. The reader includes: a base 18 which is capable of moving back and forth on a table 17; an arm support frame 19 fixed so as to be capable of ascending and descending on the base 18; an arm 20 protruding from the arm support frame 19 to the front space of the base 18; a reading head support frame 21 which can turn under the arm 20; a reading head 1 fitted onto the reading head support frame 21; an indexing protrusion 22 under the reading head support frame 21; and a holding arm 24 protruding from the base 18 toward the space under the reading head 1. The holding arm 24 is provided with a holder 23 on the turning center line l of the reading head support frame 21. The unprocessed article carrier jig 8 has: a fitting portion 25 for mounting of the unprocessed article 7 (a piston ring, as an example); a first seat plate 28 above the fitting portion 25 which is capable of being seated on the opening supports 27 in a processing device 26 (such as a plating tank or pre-treating tank) and in a carrier B (described later); a fitting portion 10 provided as a second seat plate for the punched card 9; a support rod 29 positioned between the fitting portion 10 and the first seat plate 28, and an indexing concave 30 on the upper side of the fitting portion 10. Symbol B is a carrier for carrying the unprocessed carrier jig 8 to the reader A with the first seat plate 28 of the unprocessed article carrier jig 8 seated on the opening support 27. In this system, prior to processing in the processing device 26, the unprocessed article carrier jig 8 with the unprocessed article 7 mounted thereto is carried to a predetermined position in front of the base 18 of the reader A, and the first seat plate 28 of the unprocessed article carrier jig 8 is seated on the opening support 27 of the carrier B. Then, the base 18 is moved forward by a cylinder 31 to hold the support rod 29 by the holder 23, so that the turning center line l of the reading head support frame 21 coincides with the center line l' of the support rod 29, thereby adjusting the relative position of the reading head 1 and the punched card 9 to a predetermined position. Next, the arm support frame 19 is moved downward by a cylinder 32, thereby bringing the indexing protrusion 22 into contact with the upper side of the fitting portion 10, and the reading head support frame 21 is turned to make the indexing protrusion 22 correspond to the indexing concave 30. Thus, the arranged punching positions 11 in the punched card 9 coincide with the arranged air outlets 4, 4', 4" and 4''' of the reading head 1. In this state, the arm support frame 19 is moved down again, bringing the air outlets 4, 4', 4" and 4''' into contact with or near the punched card 9, so that the processing condition data expressed in the punched card 9 can be read. After reading the processing condition data, the unprocessed article 7 is carried to the processing device 26 by another carrier 33 which fits around the fitting portion 10.

This embodiment and its operation described above illustrate merely an embodiment for applying the present invention reader to a plating system. It is naturally to be understood that such a structure and its operation can be properly arranged according to various other conditions for other distinct types of processing and kinds of unprocessed articles.

The present invention, as described above, allows identification of a wide variety of unprocessed articles by reading the processing condition data cards corresponding to the respective kinds of articles. As a result, the invention does not require any kind of identification by operators at all, thereby enhancing automation and eliminating many types of human error.

What is claimed is:

1. A pneumatic apparatus for reading punch cards containing processing condition data for articles being processed in an automatic system, said apparatus comprising:
    a pneumatic reading head for reading said punch cards, said reading head being comprised of:
    a plurality of air conduits, each conduit having an inlet and an outlet, and said outlets being aligned in one horizontal plane according to the punch out locations on said punch card,
    air supply means connected to said inlets of said air conduits for supplying air to said conduits, and
    back pressure detecting means in each of said conduits for detecting back pressure in said conduits; and
    movable carrier jig means for holding said article to be processed in said system and carrying said article through said system, said carrier jig means having a card fitting portion thereon for holding said punch card thereat, and said carrier jig means being movable toward and away from said outlets of said conduits for positioning said card fitting portion thereof adjacent said outlets;
    said air passing through said conduits creating a back pressure in said conduits corresponding to those portions of said punch cards which are solid when said punch card on said carrier jig means is positioned adjacent said conduit outlets, and said back pressure being detectable by said back pressure detecting means, whereby the solid and punched portions of said punch card can be determined.

2. An apparatus as claimed in claim 1, wherein said back pressure detecting means is comprised of:
    a U-tube connected to each of said conduits;
    mercury within said U-tube; and
    detection means adjacent said U-tube for detecting the rise of mercury in said U-tube due to back pressure in said conduit.

* * * * *